March 30, 1971  R. V. ZIMMERMAN ET AL  3,573,002
HYDRATOR FOR LIME AND THE LIKE Filed Feb. 12, 1968  2 Sheets-Sheet 1

INVENTORS.
ROBERT V. ZIMMERMAN
ADAM A. REEVES
RALPH ROSSOMME
BY JOHN B. JONES, JR.

Richard D. Law
ATTORNEY

INVENTORS.
ROBERT V. ZIMMERMAN
ADAM A. REEVES
RALPH ROSSOMME
JOHN B. JONES, JR.

BY Richard D. Law
ATTORNEY

United States Patent Office 3,573,002
Patented Mar. 30, 1971

3,573,002
HYDRATOR FOR LIME AND THE LIKE
Robert V. Zimmerman, Adam A. Reeves, Ralph Rossomme, and John B. Jones, Jr., Denver, Colo., assignors to The Battelle Development Corporation, Columbus, Ohio
Filed Feb. 12, 1968, Ser. No. 704,683
Int. Cl. C04b 1/08
U.S. Cl. 23—287                                                 11 Claims

ABSTRACT OF THE DISCLOSURE

A continuous reactor, for example, for hydrating quicklime or other hygroscopic materials, has at least two superimposed stages with feed and liquid introduced into the top stage where a fluidized bed may be created by the reaction of the material with water producing carrier steam. A portion of the feed material may be completely reacted in the upper stage and the product discharged therefrom; larger particles are transferred to the lower stage for a longer treatment with water. The reactor includes a standpipe from the upper stage for product, either powdered or liquid, and the method of lime hydration involves adding about two parts of water for each part required for complete hydration so as to produce sufficient steam to fluidize a portion of the bed in the upper stage for effective discharge of finished dry hydrated lime. Each stage is continuously mixed, and each stage has a continuous feed and discharge.

---

Large quantities of lime are used for plaster and mortar work in the construction industry throughout the world. Lime is normally made by burning lime stone, dolomite or mixtures of the same or equivalent minerals to convert the natural carbonates to oxides. The oxides, for use, are then reacted with water to make flat slaked lime. The burned material is normally called quicklime, and it in itself is a perishable product due to its hygroscopicity. Early practice converted quicklime on the job by muddling the quicklime with water in a mortar box. More recently, however, commercial lime plants have produced dry, powdered hydrated lime at the plant, and the most common commercial product is in that form.

Limes are generally classified as one of several types ranging from high calcium limes to high magnesium content limes. In the high calcium limes the magnesium oxide content rarely runs above about 2%, but in the high magnesium limes, or commonly called dolomitic limes, the magnesium content may extend up to about 40% magnesium oxide. Limes containing various amounts of magnesium oxide between the two figures are, also, known. The limes used for finishing work generally contain a high quantity of magnesium, and in the commercial form contain high quantities of magnesium hydrates. High calcium limes are easily hydrated, with the reaction of the calcium oxide and water being completed in relatively short time. On the other hand, magnesium oxides are slowly hydrated. As the amount of magnesium oxide increases in a quicklime, the amount of time necessary to hydrate the major quantities of the oxides increases. With the high dolomite limes the ordinary process, conducted at relatively low temperatures and atmospheric pressure, requires soaking the lime in water for up to twenty-four hours to hydrate the magnesium values in the lime. Under conventional practice, where lime is hydrated in batch operations the calcium oxides hydrate rapidly but the whole batch of oxide must be maintained in contact with water to hydrate the more difficult dolomitic limes. A number of prior art operations are batch process hydrations of the lime under pressure, which substantially reduces the time necessary for the hydration. In hydrating under pressure, the temperature, of course, is increased and the hydration may be completed with approximately the same amount of water as used at atmospheric pressure but with a substantial reduction of time. The commercial practice, therefore, is to hydrate quicklime by blending the quicklime and water in a vessel and retaining the mixture for a sufficient period of time to react most of the quicklime with the water. When quicklime and water are reacting together heat is evolved, therefore, it is customary for the production of essentially dry hydrate to use about twice the amount of water required for the reaction with the quicklime. Most of the excess water is converted to steam, and the heat of vaporization of water is used to control the reaction temperature. A small variation of uncalcined material in the quicklime greatly influences the water requirements. Furthermore, if the hydrate becomes too dry incomplete hydration results, even more importantly the reaction temperature becomes too hot producing over burning which changes the crystal structure of the hydrate. The equipment used for the batch process of the prior art is difficult to control and a uniform product is rarely achieved. With the higher dolomitic quicklime, the higher pressure and temperatures require different types of equipment and control of the hydration is even more difficult.

Slaked lime which is normally produced by making a slurry of lime hydrate in water, is, generally, made by mixing quicklime and sufficient water to absorb the heat of reaction and leave sufficient water to give a slurry product. The concentration of lime hydrate in the slurry may be varied from a product having a consistency of heavy paste to a liquid having a density only slightly above water. The control of the amount of water mixed with the quicklime determines the type of product.

The present invention provides apparatus and a method whereby at least two stages of hydration are used to hydrate various types of limes for the production of dry hydrates or slaked lime. The apparatus includes at least two superimposed stages, the top stage being the initial feed stage wherein water and quicklime is reacted. The reaction in the upper stage is carried out so as to produce a fluidized bed for hydrated powdered lime, for removal of dry powdered product and the transfer of unreacted lime to a lower stage for a long term residency of the lime with water for reaction in that stage. The method provides positive controls of the reaction for continuous production of a commercial product.

Included among the objects and advantages of the present invention is apparatus for hydrating various types of limes to produce a dry hydrated lime, a slaked lime, or a milk of lime as desired.

Another object of the invention is to provide apparatus which may be operated under closely controlled conditions at either atmospheric or elevated pressures, and the water rates necessary for the hydration may be controlled effectively to complete hydration of the quicklime while controlling temperature reactions to prevent over burning of the hydrate regardless of the quality of the quicklime feed into the hydrator.

A further object of the invention is to provide apparatus in which a fluidized bed can be created in a first stage so that particles of hydrated lime are fluidized by steam generated by the hydration reaction and the hydrated and/or partially hydrated particles are retained fluidized by the steam for a sufficient length of time to permit the steam to penetrate and completely hydrate any unhydrated material remaining in the center of such particles prior to being discharged from the hydrator.

A still further object of the invention is to provide apparatus having at least two stages for hydration, to enable soft burned or reactive quicklime to be hydrated in a first stage, separating any remaining slower reacting materials and transferring the same to a lower stage for long term residence in the presence of water to complete hydration of such material.

A still further object of the invention is to provide a continuous hydrator for various qualities of quicklime to produce a commercial quality of hydrated lime from a variable quality feed.

A still further object of the invention is to provide a system for hydration of quicklime wherein the heat of reaction of quicklime with water may be used to preheat primary water for the reaction, so that the reaction is controlled and the reactive quicklime is hydrated, removed and slow reacting material is transferred to a subsequent stage for a long residence time with water to complete hydration of such slow reactive materials.

These and other objects and advantages of the invention may be readily ascertained by referring to the following description and appended illustration in which.

Figure 1:
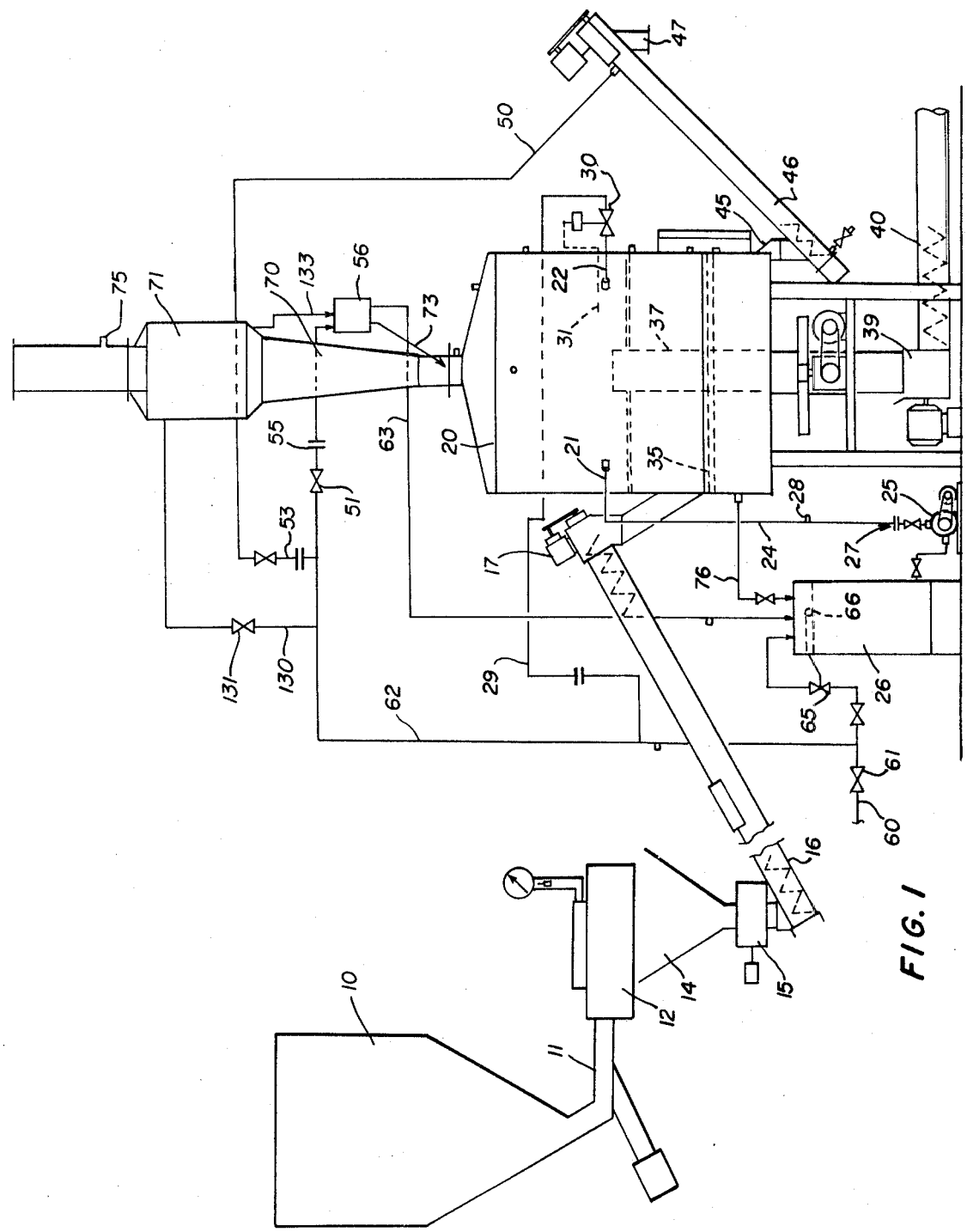
FIG. 1 is a generally schematic view of a flow diagram of a process for hydrating such materials such as quicklime.

A typical flow diagram of the present invention is illustrated in FIG. 1, wherein quicklime feed, from a kiln, is stored in a bin 10. The feed is usually lump quicklime from the kiln. Feed is withdrawn from the bin 10 by a conveyor 11 to a grivimetric feeder 12. The feed is dropped into hopper 14 connected to a grinder or hammer mill 15. The quicklime lumps are reduced in size in the mill 15, for example, minus ¼ inch, and conveyed by a spiral flight conveyor 16 to hydrator or reaction chamber 20. A variable speed electric motor 17 provides control for the transfer of a sized material into the reaction chamber or reactor 20. The operation and internal transfer of material in the reaction chamber is set forth below. Water is introduced into the reactor in three ways. The primary water requirement is introduced from a supply 60 through lines 62, 130, and valve 131 into a scrubber 71, through a mixer 56 and into reservoir 26. The water from the reservoir passes through pump 25, through a valve and flow indicator 27, a temperature indicator 28 and into manifolds 21 which connects with feeders 21a in the upper stage of the reactor. A second manifold inlet 22 is controlled by means of a valve 30 which is actuated by a temperature probe 31. The manifold 22 is connected to line 29 and fresh water supply 60. The third water supply is from the fresh water supply 60, through control valve 53 into line 50 and into uncalcined material reject screw 46 so as to wash all hydrated material from the unhydrated rejects. This water passes into the lower stage through the screw.

Quickline from the conveyor 16 is discharged onto a rotary table 35 internally of the reactor, and it is contacted with water from the inlets. Powdered lime which is hydrated is fluidized by the produced steam, and it is discharged through a down-comer 37 which discharges into a receiving hopper 39 for a spiral flight conveyor 40 which discharges in a product bin. Unreacted lime is discharged from a lower stage below the rotary table 35 through a peripheral outlet 45 into the spiral flight conveyor 46. Washed material from the conveyor 46 is discharged through an outlet 47. Fresh water from an inlet line 60 passes through a valve 61 into line 62 and either into the scrubber 71 through line 130, controlled by valve 131 or the line 50. Water may be by-passed directly into tank 26 through a control valve 65, controlled by a float 66 in the storage tank 26 to provide means for maintaining the proper level in the tank should the tank level drop below a predetermined point.

The eraction of the water with the quicklime in the reactor produces steam, and the steam passes up stack 70 from the reactor 20 into the scrubber 71 where the steam is condensed. The condensed steam and hydrated particles picked up in the scrubber pass through line 133 into the mixer or small reservoir 56 and into the reactor through downtake line 73. A thermocouple 75 is used to control the amount of water going into the scrubber from the temperature of the exhaust gases from the reactor.

The level of solids in the lower stage is controlled by the rate of discharge of the solids from the lower stage of the reactor through the outlet 45, this rate of discharge is controlled by adjusting the r.p.m. of the spiral flight conveyor 46. The rejected lumps from the outlet 47 after washing in conveyor may be sent back to the hopper 10 or back to the kiln for further processing and recycling.

The control of the water requirements for the hydration controls the temperature in the stages of the reactor. Water added through the line 50 maintains the water level as desired in the lower stage of the reactor. In normal practice, the water added through the reject conveyor travels through the screw and into the second stage and exits into the bottom of the first stage. The primary water requirement is preheated water from the scrubber, and the temperature control is by water addition through line 29, from the fresh water supply, into the second manifold 22 in the first stage, through thermostat probe 31. The operation of this temperature control device is as such, that when insufficient water is added to the system the temperature in the first stage increases and the humidity decreases. On this increased temperature, the water flow is increased into the manifold 22, and when the temperature decreases the water flow is, likewise, decreased to thereby maintain a uniform temperature. For producing dry hydrate, the temperature is maintained high, producing a fluidized bed which overflows product into downcomer 37. When the reactor is used as a slaker the temperature of the hydration reaction is decreased so that instead of a dry hydrate in a fluidized bed, a slurry of the hydrate overflows the down-comer and is collected through the spiral conveyor 40. The amount of water added to the system is controlled to give the desired concentration of the hydrate in the slurry, with the control being effected automatically by the control valve in the water line supplying the plows 92. That control valve may be actuated by either a temperature controller or a specific gravity sensing device. When the unit is used as a slaker, the scrubber may be eliminated from the stack as there will be generally no stack production.

As will be seen from the description of the reactor below, the system may be operated under pressure, and for such a pressure system conventional rotary valves may be placed at the feed inlet and exhaust of the solids, plus the addition of a pressure control valve in the stack line to control pressure of the operation. The foregoing description of the system pertains to a two-stage hydrator, and the structural description of the hydrator given below is directed to a two stage hydrator. Since the stages are superposed one above the other, additional stages may be added as desirable or feasible. Additional stages may be desirable where the quicklime feed into the hydrator is consistently of an inferior quality or having been considerably over heated or hard burned in the calcining operation. The additional stages operate essentially in the same manner as the lower stage of the two stage hydrator so as to give the unhydrated lime additional residence time in contact with water, thus, the slower reacting materials may be inundated in a bath of water in the second and sequent stages. It is, generally, more desirable to use more than two stages when hydrating dolomitic quicklimes.

Figure 3:
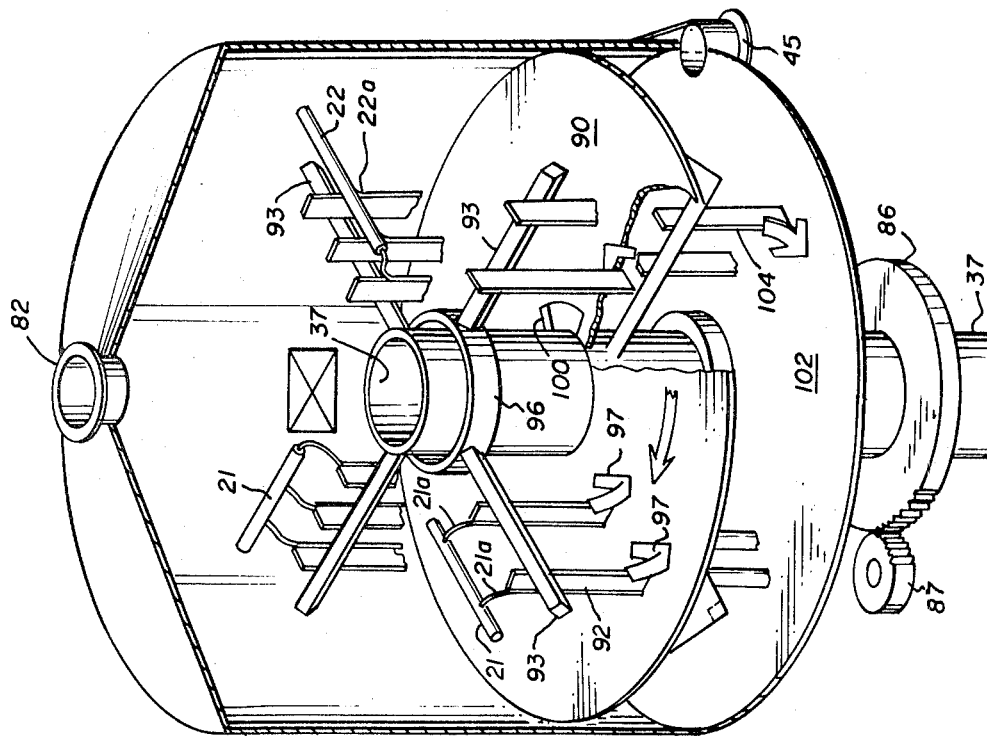
FIG. 3 is a perspective view, partially cut-away, of the reaction stages of the vessel of FIG. 2.
Figure 2:
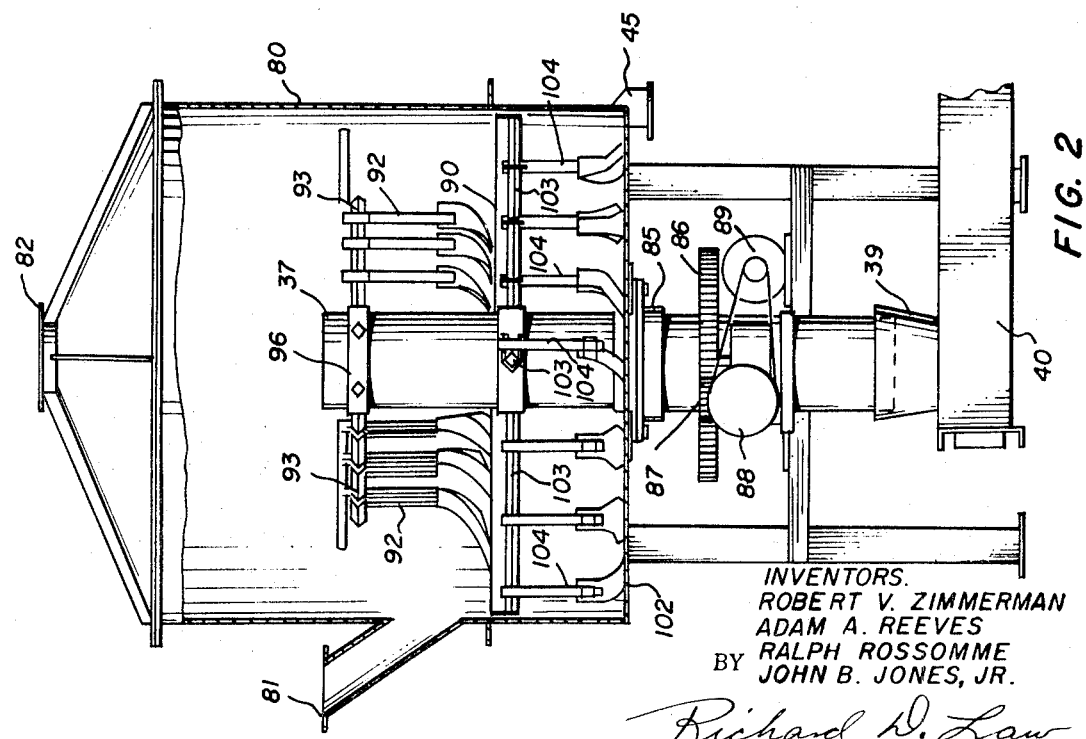
FIG. 2 is a side elevational view, in partial cross-section, of a reactive vessel according to the invention.

The construction of the hydrator or reactor is illustrated in detail in FIGS. 2 and 3, wherein a reactor shell 80 is provided with a solids feed inlet 81, which is usually attached to a feed arrangement such as the spiral flight conveyor 16 of FIG. 1, a solids reject outlet 45 and a gaseous and lighter solids exhaust 82 at the top of the vessel. The vessel should be otherwise completely enclosed so as to operate as a pressure vessel. A down-comer 37, which is a tubular member, empties into a surge hopper 39 feeding a spiral flight conveyor 40. The surge hopper and variable speed auger in conveyor 40 controls the discharge of product from the down-comer passes through a stuffing box 85, and it is rotated by means of a bull gear 86 and a spur 87. The gear 87 is attached to a speed reducer 88 driven by an electric motor 89. A rotary table 90, equivalent to table 35 of FIG. 1, is attached to the down-comer tube and rotates therewith. For mixing and moving the material on the table 90, a plurality of downwardly depending plows 92 are secured to a plurality of tool bars 93 attached to and extending radially inwardly of the shell 80. As shown in FIG. 3, four tool bars are used and these are secured to a support ring 96 around the down-comer 37 but not connected thereto. Various types of head 97 may be provided for the plows to give a general direction of movement of the material on the rotary table, and in general an inward thrust toward outlet 100 near the down-comer. A pair of primary manifolds 21 feed water into tubes 21a which exhaust near the bottom of the plows. At least one opening 100 is provided in the table 90 for discharging materials from that table onto the bottom 102 of a shell 80. A plurality of tool bars 103, FIG. 2, provided with plows 104 are attached to the bottom side of the table 90 so as to rotate therewith. On the bottom of each of the plows 104 is mounted a head arranged to give an outward movement direction to material on the bottom plate 102 towards the periphery so as to discharge solid material through the discharge outlet 45.

The function of the reactor or hydrator is to produce a product which exhausts through the down-comer 37. A discontinuous bed of unhydrated quicklime is maintained on the rotary table 90 from inlet 81 in a sufficient quantity so that water reacting with the quicklime produces a substantial amount of steam. The lighter particles of hydrated and partially hydrated lime will be borne up or suspended in this steam. This suspension of fine particles in the rising layer of vapor is known as a fluidized bed; a fluidized bed has the characteristics of a fluid mixture and, in particular, exhibits a fluid-level. The suspended particles of partially hydrated lime are further hydrated by suspension in the fluidized bed. By controlling quantity of the feed and the water, the depth of the fluidized bed may be maintained so that the fluidized bed overflows into the down-comer 37 and the product is recovered from the surge tank 39. The reaction of the water with the quickime may produce a powder. When the amount of water is introduced at a rate of about two parts of water for each part required for hydration of lime, a substantially dry hydrate may be produced. The steam which is produced by the heat of the reaction exhausts from the bed and out through the stack port 82. The unreacted quickime, which is usually the slower reaction quicklime and unburned limestone or dolomite, is mixed and slowly directed toward the opening 100 in the table 90 so that it discharges into the lower stage on plate 102. The rotation of the table may be varied according to the conditions of the reaction to slowly move the material at the desired rate in an outwardly direction towards the discharge 45 on the periphery of the plate 102. As pointed out above the amount of water in the lower stage is maintained at a level sufficient to cover all the material in the lower stage and for some water to seep into the bottom of the upper stage. The construction is such to provide a close fit between the table and the shell, and where desired a rotary seal may be provided.

The versatility of the reactor permits operation to produce a dry hydrate, slaked lime and a milk of lime. The milk of lime is produced by adding sufficient water to flood the lower and upper stages, and recovering liquid milk of lime from the down-comer. The concentration of lime in or specific gravity of the pregnant liquid product is easily controlled by the control of water introduced into the reactor. Further, the reactor may be operated to produce classification of unwanted impurities which have a higher density than the product. These impurities are discharged from the bottom of the upper zone into the lower zone and are discharged with unreacted material. This classification occurs where the product stream is lighter than the rejects, and the product stream may consist of lighter solids or a liquid discharged through the down-comer.

While the invention has been described by reference to a particular embodiment, there is no intent to limit the spirit and scope of the invention to the precise details so set forth except as defined in the following claims.

We claim:

1. A reaction vessel for continuous feed and product recovery having at least two superimposed reaction zones comprising an imperforate shell; an upper outlet for gaseous products and a bottom outlet for solid reactants; at least one horizontal partition separating said shell into at least an upper and a lower zone; inlet means into said upper zone for particulate solid reactants; a stand pipe having an intake end in said upper zone and extending through an opening in said partition to a discharge outlet below said shell; there being at least one open passageway in said partition in addition to said opening for said stand pipe for movement of reactants from said upper to said lower zone; means for mixing reactants in said upper zone and to progressively move solid reactants toward said at least one opening; means for mixing reactants in said lower zone and to progressively move solid reactants toward said bottom outlet; means for introducing liquid reactants into said upper zone at selected positions and for controlling such introduction; means for the discharge of solids from said bottom outlet; and means for selectively introducing liquid reactants into said lower level whereby the fluid level of said second liquid reactants in said shell is selectively raised, countercurrently to the movement of said solid reactants, through said at least one opening in said partition to inundate said solid reactants in said upper zone.

2. A reaction vessel according to claim 1 wherein said side inlet is above said partition to deposit solids on said partition.

3. A reaction vessel according to claim 1 wherein said partition is rotary and said means for mixing in said upper zone are stationary plows.

4. A reaction vessel according to claim 3 wherein said means for mixing in said lower zone are plows rotated by said partition.

5. A reaction vessel according to claim 1 wherein said stand pipe is a centrally mounted pipe and said passageway exteriorly surrounds said stand pipe.

6. A reaction vessel according to claim 1 wherein said at least one passageway in said partition is centerwise thereof.

7. A reaction vessel according to claim 1 wherein said means for introducing liquid reactants into said lower zone is dependent from and communicant with said means for the discharge of solids from said bottom outlet whereby said liquid reactants flow countercurrently to said solids flow.

8. A reaction vessel according to claim 3 wherein said opening in said partition is centrally thereof so that solids on said partition move progressively from said inlet to said central opening, and said bottom outlet is adjacent the periphery of said shell so that solids in said lower zone are moved progressively outwardly to said bottom outlet.

9. A reaction vessel according to claim 1 in which each said inlet and each said outlet have pressure locks whereby a continuous process may be conducted under pressure greater than atmospheric.

10. A reaction vessel according to claim 1 wherein said stand pipe is rotatable in said shell and said partition is connected and rotatable with said stand pipe.

11. A reaction vessel according to claim 1 wherein said means for introducing liquid reactants into said upper stage are further characterized by temperature transducer and valve means controlling the liquid reactant introduction.

References Cited
UNITED STATES PATENTS

| | | | |
|---|---|---|---|
| 1,265,964 | 5/1918 | Schaffer | 23—287 |
| 2,479,126 | 8/1949 | Lipscomb | 210—522X |
| 2,611,683 | 9/1952 | Knibbs | 23—287X |
| 2,684,840 | 7/1954 | Behme et al. | 23—288.35 |

JAMES H. TAYMAN, Jr., Primary Examiner

U.S. Cl. X.R.

23—188, 1, 284, 285, 260